(12) United States Patent
Simi

(10) Patent No.: US 8,076,860 B2
(45) Date of Patent: Dec. 13, 2011

(54) POWER CONVERTER AND POWER CONVERSION METHOD WITH REDUCED POWER CONSUMPTION

(75) Inventor: Victor M. Simi, Lexington, KY (US)

(73) Assignee: Osram Sylvania Inc., Danvers, MA (US)

(*) Notice: Subject to any disclaimer, the term of this patent is extended or adjusted under 35 U.S.C. 154(b) by 456 days.

(21) Appl. No.: 12/291,073

(22) Filed: Nov. 6, 2008

(65) Prior Publication Data
US 2010/0109539 A1    May 6, 2010

(51) Int. Cl.
H05B 37/00 (2006.01)
H05B 37/02 (2006.01)
H05B 39/00 (2006.01)
H05B 39/04 (2006.01)
H05B 41/14 (2006.01)
H05B 41/36 (2006.01)
H01J 7/44 (2006.01)
G05F 1/00 (2006.01)

(52) U.S. Cl. ............. 315/206; 315/57; 315/72; 315/291
(58) Field of Classification Search .................... 315/32, 315/51, 57, 70, 72, 205, 206, 224–226, 276, 315/291, 307, 308; 323/227, 291; 363/83, 363/94, 99
See application file for complete search history.

(56) References Cited

U.S. PATENT DOCUMENTS

| 4,949,016 | A  | * | 8/1990  | De Bijl et al. ............. | 315/208 |
| 5,615,093 | A  | * | 3/1997  | Nalbant ..................... | 363/25  |
| 6,657,402 | B2 | * | 12/2003 | Bron et al. .................. | 315/291 |
| 6,804,129 | B2 | * | 10/2004 | Lin ............................ | 363/98  |
| 6,909,245 | B2 | * | 6/2005  | Van Der Veen et al. ..... | 315/224 |
| 7,417,382 | B2 | * | 8/2008  | Lin ............................ | 315/225 |
| 7,492,620 | B2 | * | 2/2009  | Fukumoto ................... | 363/98  |
| 7,558,081 | B2 | * | 7/2009  | Green et al. ............... | 363/21.03 |
| 7,579,787 | B2 | * | 8/2009  | Chen et al. ................. | 315/291 |
| 7,701,153 | B2 | * | 4/2010  | Itou et al. .................. | 315/363 |
| 2001/0030514 | A1 | * | 10/2001 | Takahashi et al. .......... | 315/219 |
| 2004/0012346 | A1 | * | 1/2004  | Green et al. ................ | 315/291 |
| 2010/0109754 | A1 | * | 5/2010  | Simi ........................... | 327/530 |

FOREIGN PATENT DOCUMENTS

| CN | 201 060 854 Y | 5/2008 |
| EP | 1 126 586 A1  | 8/2001 |
| EP | 0 862 844 B1  | 2/2002 |
| WO | 98/18199 A1   | 4/1998 |

OTHER PUBLICATIONS

Extended European Search Report, European Patent Office, dated Feb. 12, 2010.

* cited by examiner

Primary Examiner — Shawki S Ismail
Assistant Examiner — Dylan White
(74) Attorney, Agent, or Firm — Shaun P. Montana

(57) ABSTRACT

A power converter and power conversion method converts an input AC signal to a voltage usable by a load while reducing power consumption, thereby making the converter and method suitable for a wider range of applications. A rectifier receives the AC input signal and outputs a rectified voltage Vs, a controller has a power input connected to Vs and outputs two out-of-phase signals, two transistors are connected in series between Vs and a ground and each of the two transistors has a gate connected to a respective one of the two out-of-phase signals, and a transformer that has a primary coil connected to a node between the two transistors and a secondary coil connected to a load feeds back current from the secondary coil to the power input of the controller to reduce power consumption.

4 Claims, 2 Drawing Sheets

POWER CONVERTER AND POWER CONVERSION METHOD WITH REDUCED POWER CONSUMPTION

BACKGROUND OF THE INVENTION

The present invention is directed to a power converter and a power conversion method that supplies a specified power to a load, and more particularly to a power converter and power conversion method for a lamp. A power converter receives an input, such as a line AC input, and converts the input to a voltage suitable for operation of the load.

In some lamps, the voltage suitable for operation is desirably much lower than line voltage in order to increase efficiency of the lamp. For example, efficiency of a 120 volt halogen lamp is improved by reducing the operating voltage by a factor of ten. Further, it is desirable to integrally include such a converter inside a base of the lamp. However, the heat generated by presently available power converters effectively limits their applicability to lamps of less than about 30 watts. Since the heat generated by the converter relates to the power consumed by the converter, it is desirable to reduce the power consumption of the converter.

SUMMARY OF THE INVENTION

An object of the present invention is to provide a novel power converter and power conversion method that avoids the problems of the prior art.

A further object of the present invention is to provide a novel power converter and power conversion method in which power is conserved by feeding back a current from a secondary coil of a transformer to a power input of a controller that controls operation of the transformer.

A yet further object of the present invention is to provide a novel power converter that includes a rectifier that receives an AC input signal and outputs a rectified voltage Vs, a controller whose power input is connected to Vs and that outputs two out-of-phase signals, two transistors connected in series between Vs and a ground, each of the two transistors having a gate connected to a respective one of the two out-of-phase signals, and a transformer having a primary coil connected to a node between the two transistors and a secondary coil connected to a load and to the power input of the controller.

Another object of the present invention is to provide a novel power conversion method in which a received AC input signal is rectified to voltage Vs, in which Vs is provided to a power input of a controller, the controller outputting two out-of-phase signals, in which each of the two out-of-phase signals is provided to a respective gate of two transistors connected in series between Vs and a ground, and in which a transformer having a primary coil connected to a node between the two transistors and a secondary coil connected to a load, feeds back a current from the secondary coil to the power input of the controller.

These and other objects and advantages of the invention will be apparent to those of skill in the art of the present invention after consideration of the following drawings and description of preferred embodiments.

DESCRIPTION OF PREFERRED EMBODIMENTS

Figure 1:
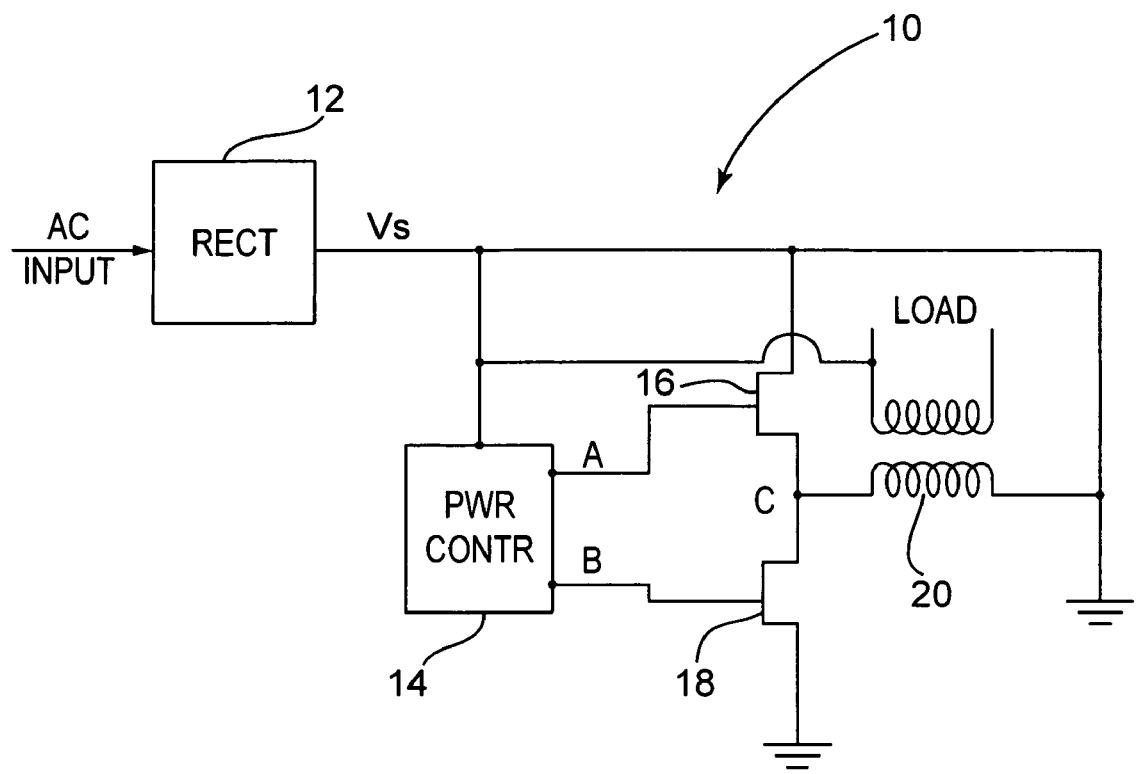
FIG. 1 is schematic diagram of an embodiment of the present invention.

With reference now to FIG. 1, a power converter 10 of the present invention includes a rectifier 12 that receives an AC input signal and outputs a rectified voltage Vs, a controller 14 whose power input is connected to Vs and that outputs two out-of-phase signals A, B, two transistors 16, 18 connected in series between Vs and a ground, each of the two transistors having a gate connected to a respective one of the two out-of-phase signals, and a transformer 20 having a primary coil connected to a node C between the two transistors and a secondary coil connected to a load and to the power input of the controller.

In operation, the controller 14 generates signals A, B that drive transistors 16, 18. The current that then flows through the primary coil of transformer 20 is changed by the turns ratio of the transformer to provide the proper current for the load. The current feedback from the secondary coil of the transformer to the power input of the controller 14 provides power to sustain the operation of the controller during normal operation. This method of feedback conserves power, thereby reducing power consumption and heat generated by the power converter.

Figure 2:
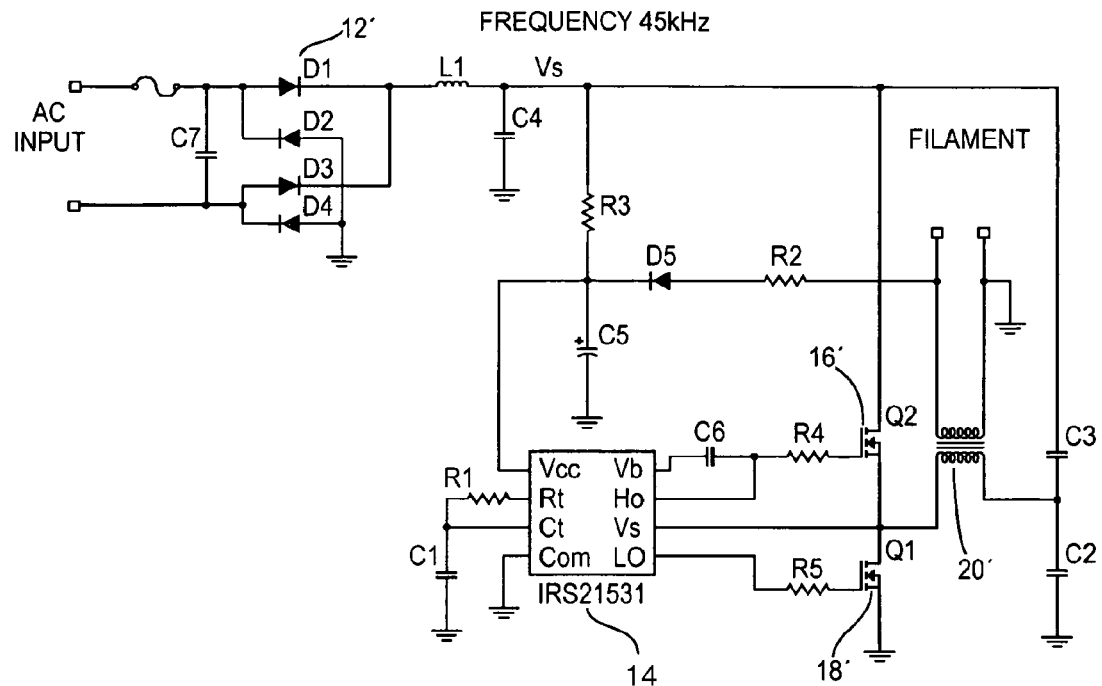
FIG. 2 is a diagram showing a circuit suitable for the embodiment of FIG. 1

A more particular embodiment is shown in FIG. 2. In this embodiment, the rectifier 12' may be a full wave bridge with diodes D1-D4, and may include an electro-magnetic interference (EMI) suppression circuit that includes capacitors C4 and C7 and inductor L1. The controller 12' may be an integrated circuit with a built-in oscillator and MOSFET driver, such as the IR21531 shown. The frequency of the built-in oscillator may be set by a time constant circuit that includes resistor R1 and capacitor C1. The transistors 16', 18' may be MOSFETs Q1 and Q2 connected to the controller through resistors R4-5 and capacitor C6 as shown. The power input Vcc of the controller may be connected to Vs through a node between resistor R3 and capacitor C5. In operation, once Vs starts to increase, current flows through resistor R3, charging capacitor C5 until the clamping action of the controller limits its amplitude, which for a lamp may be a nominal 15 volts. The primary coil of transformer 20' may be connected to a node between capacitors C2 and C3 and the secondary coil may feedback to the power input of the controller through resistor R2 and diode D5 as shown. The circuit generates a high frequency AC output at the load (e.g., at 12 volts for a lamp) that is modulated at 120 hertz, for example. The resulting input power factor is very close to unity (about 0.985 or better) and the total harmonic distortion is very low.

Figure 3:
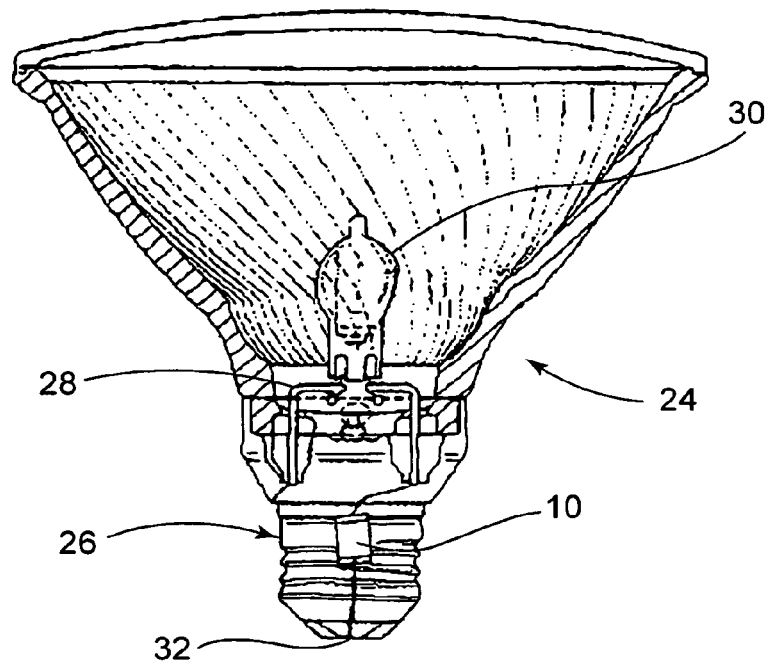
FIG. 3 is a partial cross-section of a lamp including the present invention.

FIG. 3 shows an embodiment wherein the power converter 10 is in a lamp 24 (e.g., a halogen light source) that includes a base 26 and electrodes 28 that are connected to a bulb 30, wherein the converter 10 is entirely within the base 26, wherein the rectifier is connected to a lamp terminal 32 on a exterior of the base, and wherein the load is the electrodes 28. The converter 10 can be packaged as an integral part of the lamp, and can operate directly off the AC line input, where the filter reduces both the conducted and radiated EMI. By selecting the transformer turns ratio and time constant, the converter can operate with 120 or 220-240 volts at both 50 and 60 hertz.

The power converter and power conversion method described herein offers several advantages. Among those advantages are that the converter includes a relatively simple construction that includes only one integrated circuit so that the converter can be low cost and small enough for a lamp base. It operates on a relatively unfiltered AC input that generates an output set by the turns ratio of the transformer. This gives the converter the ability to be easily adapted to various line voltages. The duty cycle has built-in delays to prevent the transistors from overheating due to cross-over currents. The frequency of operation of the controller is controlled so the EMI signature is predictable and stable at high temperatures. The AC input at the load is a very pure sine wave with a power factor close to 1. Further, the feedback from the secondary coil of the transformer reduces power consumption and in a tamp limits in-rush current at cold filament start-up.

While embodiments of the present invention have been described in the foregoing specification and drawings, it is to be understood that the present invention is defined by the following claims when read in light of the specification and drawings.

I claim:

1. A power conversion method, comprising the steps of: rectifying a received AC input signal to output a rectified voltage Vs; providing Vs to a power input of a controller, the controller outputting two out-of-phase signals; providing each of the two out-of-phase signals to a respective gate of two transistors connected in series between Vs and a ground; and in a transformer having a primary coil connected to a node between the two transistors and a secondary coil connected to a load, feeding back a current from the secondary coil to the power input of the controller.

2. The method of claim 1, in a lamp that includes a base and electrodes, wherein the converter is entirely within the base, wherein the rectifier is connected to a lamp terminal on a exterior of the base, and wherein the load is the electrodes.

3. The method of claim 1, further comprising the step of setting a frequency of the two out-of-phase signals with a time constant circuit connected to the controller.

4. The method of claim 1, further comprising the steps of connecting a resistor and a capacitor in series between Vs and the ground, and connecting the power input of the controller to Vs through a node between the resistor and the capacitor.

* * * * *